(12) United States Patent
Mayville et al.

(10) Patent No.: US 8,764,054 B2
(45) Date of Patent: *Jul. 1, 2014

(54) GAS GENERATING SYSTEM

(75) Inventors: Brian A. Mayville, Troy, MI (US); Dale E. Tauchen, Clinton Township, MI (US); Joshua D. VanHooser, Waterford, MI (US)

(73) Assignee: TK Holdings Inc., Armada, MI (US)

( * ) Notice: Subject to any disclaimer, the term of this patent is extended or adjusted under 35 U.S.C. 154(b) by 172 days.

This patent is subject to a terminal disclaimer.

(21) Appl. No.: 12/700,473

(22) Filed: Feb. 4, 2010

(65) Prior Publication Data

US 2010/0194085 A1 Aug. 5, 2010

Related U.S. Application Data

(60) Provisional application No. 61/206,800, filed on Feb. 4, 2009.

(51) Int. Cl.
*B60R 21/264* (2006.01)

(52) U.S. Cl.
USPC .......................................... 280/736; 280/741

(58) Field of Classification Search
USPC ................................. 280/736, 741
See application file for complete search history.

(56) References Cited

U.S. PATENT DOCUMENTS

| | | | | |
|---|---|---|---|---|
| 3,810,655 A | | 5/1974 | Pracher | 280/150 |
| 3,813,007 A | | 5/1974 | Doin et al. | 222/4 |
| 5,487,561 A | | 1/1996 | Mandzy et al. | 280/741 |
| 5,669,631 A | * | 9/1997 | Johnson et al. | 280/741 |
| 6,039,347 A | * | 3/2000 | Maynard | 280/736 |
| 6,076,468 A | * | 6/2000 | DiGiacomo et al. | 102/530 |
| 6,196,583 B1 | * | 3/2001 | Ruckdeschel et al. | 280/736 |
| 6,412,814 B1 | * | 7/2002 | Huber et al. | 280/736 |
| 6,481,357 B1 | * | 11/2002 | Lindner et al. | 102/530 |
| 6,616,183 B2 | * | 9/2003 | Huber et al. | 280/736 |
| 6,896,287 B2 | * | 5/2005 | Last et al. | 280/736 |
| 7,770,924 B2 | | 8/2010 | Cox et al. | 280/741 |
| 7,878,536 B2 | * | 2/2011 | Rose et al. | 280/737 |
| 7,887,091 B1 | * | 2/2011 | Cox et al. | 280/741 |
| 7,914,040 B1 | | 3/2011 | Stevens | 280/737 |
| 2002/0158454 A1 | * | 10/2002 | Huber et al. | 280/736 |
| 2003/0137132 A1 | * | 7/2003 | Last et al. | 280/736 |
| 2010/0001320 A1 | | 1/2010 | Rohlfing | 257/204 |
| 2010/0176580 A1 | * | 7/2010 | Tauchen | 280/741 |

FOREIGN PATENT DOCUMENTS

WO WO 2007/141335 A1 12/2007 ............ B60R 21/264

OTHER PUBLICATIONS

Office Action U.S. Appl. No. 12/928,308, filed Dec. 8, 2010, Mailed Mar. 16, 2011.
Office Action U.S. Appl. No. 12/928,308, filed Dec. 8, 2010, Mailed Sep. 8, 2011.
Office Action U.S. Appl. No. 12/156,611, filed Jun. 2, 2008, Mailed Sep. 22, 2010.

(Continued)

*Primary Examiner* — Paul N Dickson
*Assistant Examiner* — Barry Gooden, Jr.
(74) *Attorney, Agent, or Firm* — L.C. Begin & Associates, PLLC.

(57) ABSTRACT

A gas generating system includes a housing, a gas generant combustion chamber within the housing, and a liquid coolant chamber within the housing. A mixing chamber is positioned within the housing so as to enable fluid communication with the combustion chamber and the coolant chamber after activation of the gas generating system.

8 Claims, 5 Drawing Sheets

(56) References Cited

OTHER PUBLICATIONS

Office Action U.S. Appl. No. 12/156,611, filed Jun. 2, 2008, Mailed Nov. 8, 2010.
Office Action U.S. Appl. No. 12/156,611, filed Jun. 2, 2008, Mailed Mar. 25, 2011.
Office Action U.S. Appl. No. 23/156,611, filed Jun. 2, 2008, Mailed Aug. 10, 2011.
Office Action U.S. Appl. No. 12/156,537, filed Jan. 22, 2009, Mailed Oct. 26, 2010.
Office Action U.S. Appl. No. 12/321,537, filed Jan. 22, 2009, Mailed Apr. 1, 2011.
Office Action U.S. Appl. No. 12/321,537, filed Jan. 22, 2009, Mailed Aug. 1, 2011.

* cited by examiner

GAS GENERATING SYSTEM

CROSS REFERENCE TO RELATED APPLICATIONS

This application claims the benefit of provisional application Ser. No. 61/206,800, filed on Feb. 4, 2009.

BACKGROUND OF THE INVENTION

The present invention relates to gas generating systems for generating pressurized gases used to inflate one or more inflatable devices.

SUMMARY OF THE INVENTION

In accordance with one aspect of the embodiments of the present invention, a gas generating system is provided including a housing, a gas generant combustion chamber within the housing, and a liquid coolant chamber within the housing. A mixing chamber is positioned within the housing so as to enable fluid communication with the combustion chamber and the coolant chamber after activation of the gas generating system.

In accordance with another aspect of the embodiments of the present invention, a gas generating system is provided including a housing, a coolant chamber defined within the housing, and an opening enabling fluid communication between the coolant chamber and an exterior of the coolant chamber after activation of the gas generating system. A coolant material is positioned within the coolant chamber. A movable member is positioned within the housing such that movement of the movable member urges coolant along the opening.

In accordance with another aspect of the embodiments of the present invention, a gas generating system is provided including a housing, a combustion chamber within the housing, and a coolant within the housing. A movable member is positioned in operative communication with the combustion chamber and the coolant such that combustion of a gas generant material in the combustion chamber produces combustion products which move the movable member. Movement of the movable member threes the coolant into fluid communication with the combustion products.

DETAILED DESCRIPTION

Figure 1:
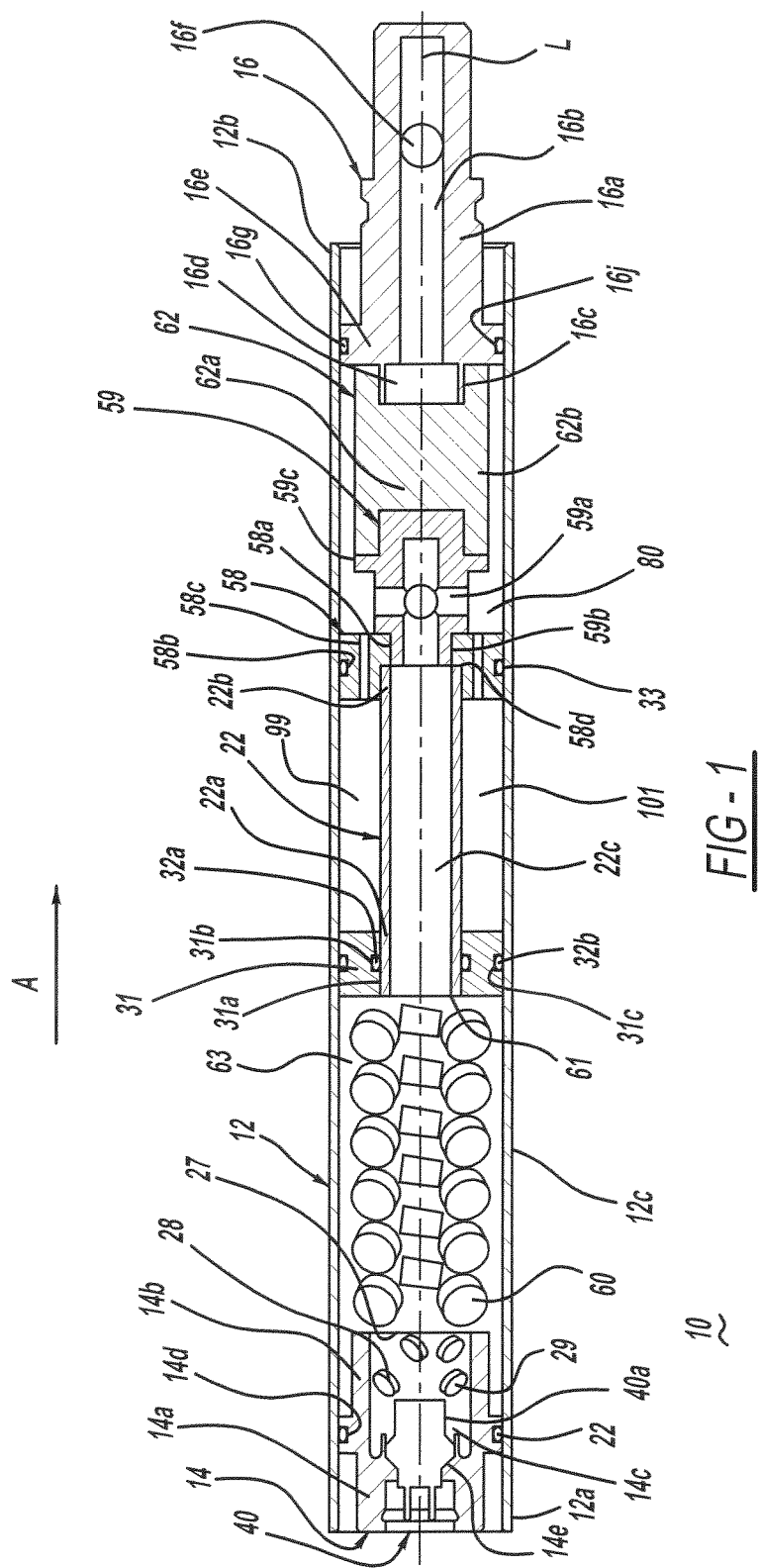
FIG. 1 is a cross-sectional side view of a gas generating system in accordance with a first embodiment of the present invention.

FIG. 1 shows a gas generating system 10 incorporating a liquid coolant, in accordance with a first embodiment of the present invention.

Gas generating system 10 includes a substantially cylindrical housing 12 having a pair of opposed ends 12a, 12b and a wall 12c extending between the ends to define a housing interior cavity. A longitudinal axis L extends along the length of the housing. Housing 12 may be extruded, roll-formed, or otherwise fabricated from a metal, metal, alloy, or any other suitable material.

A first end closure 14 is secured to end 12a of housing 12, using one or more known methods, for example crimping or welding. End closure 14 has formed therein a base portion 14a, a wall 14b extending from the base portion, a cavity 14d formed along a periphery of base portion 14a, and a central orifice 14e extending through base portion 14a. Wall 14b and base portion 14a define a cavity 14c in which a quantity of a known booster material 28 (described below) is positioned. An O-ring or other resilient seal 22 is positioned in peripheral cavity 14d to provide a substantially gas-tight seal along the interface between end closure 14 and housing wall 12c. End closure 14 may be stamped, cast, machined, or otherwise formed from carbon steel, stainless steel, or any other suitable material.

End closures in the embodiments of may be secured in or to the ends of their respective housings using any suitable method, for example, crimping or welding. In the embodiments shown in FIGS. 1-3, opposing ends crimped over portions of the end closures.

Referring to FIG. 1, an igniter assembly 40 containing an igniter 40a is positioned and secured within end closure central orifice 14e so as to enable fluid communication between the igniter and booster material 28 positioned in end closure cavity 14c. Igniter assembly 40 may be secured in central orifice 14e using any one of several known methods, for example, by welding, crimping, using an interference fit, or by adhesive application. Igniter assemblies suitable for the application described herein may be obtained from any of a variety of known sources, for example Aerojet of Sacramento, Calif. or Aerospace Propulsion Products B.V., of The Netherlands. Igniter 40a may be formed as known in the art. Exemplary igniter constructions are described in U.S. Pat. Nos. 6,009,809 and 5,934,705, incorporated herein by reference. Igniter 40a may be secured within igniter assembly 40 by any one of a variety of methods, for instance using welds, adhesives, by crimping, or by integrally molding the igniter into a portion of the igniter assembly.

Referring to FIG. 1, a quantity of a known booster material 28 is positioned within end closure cavity 14c. Activation of igniter 40a produces combustion of the booster material, producing ignition of gas generant composition 60 (described below) in a manner known in the art.

A quantity of a known heat-activated auto-ignition material 29 may be positioned within the gas generating system so as to enable fluid communication between the auto-ignition material and an associated gas generant material 60 and/or an associated booster material 28 upon activation of the gas generating system. In the embodiment shown in FIG. 1, auto-ignition material 29 is positioned within end closure cavity 14c, in fluid communication with booster material 28. Auto-ignition material 29 is a pyrotechnic material which is ignited by exposure to a temperature lower than the ignition temperature of gas generant 60. As is known in the art, auto-ignition material 29 is ignited by heat transmitted from an exterior of housing 12 to the interior of the housing due to an elevated external temperature condition (produced, for example, by a fire). Combustion of auto-ignition material 29 results in combustion of gas generant 60, either directly or through intervening combustion of booster material 28. Suitable auto ignition materials are known to those skilled in the art. Examples of suitable auto-ignition materials are nitro-cellulose based compositions and gun powder.

End closure cavity 14c may be covered with a rupturable, gas-tight seal or shim 27 to seal the orifice. Various known disks, foils, films, or tapes (for example, aluminum or stainless steel shims, foil or tape) may be used to form the seal. The seal material is typically adhered to a surface of the end closure through the use of an adhesive. Alternatively, other materials or methods may be used to seal end closure cavity 14c.

Referring again to FIG. 1, a quantity of a propellant or gas generant material 60 is contained within housing 12 between end closure 14 and a movable divider 31 (described below) for production of gases when ignited by igniter booster material combustion products. This portion of the housing interior between end closure 14 and movable divider 31 defines a gas generant combustion chamber 63. Gas generant 60 may be in any of a variety of forms, for example tablets, stacked wafers, or in granulated form. Gas generant material 60 may be formulated by known methods, and in one embodiment is exemplified by "smokeless" gas generant compositions as described in U.S. Pat. Nos. 5,872,329, 6,074,502, 6,287,400, 6,306,232 and 6,475,312 incorporated by reference herein. As used herein, the term "smokeless" should be generally understood to mean such propellants as are capable of combustion yielding at least about 90% gaseous products based on a total product mass; and, as a corollary, no more than about 10% solid products based on a total product mass. However, the present invention is not limited to the use of smokeless gas generant compositions therein.

Movable divider 31 is positioned within housing 12 so as to enable fluid communication with gas generant combustion by-products upon activation of the gas generating system. Divider 31 has a central opening 31a, a first cavity 31b formed in a wall of opening 31a, and a second cavity 31c formed in an outer wall of the divider. An O-ring or other resilient seal 32a is positioned in cavity 31b to provide a substantially gas-tight seal along the interface between divider and a combustion products transfer tube 22 (described below). An O-ring or other resilient seal 32b is positioned in cavity 31c to provide a substantially gas-tight seal along the interface between divider and housing wall 12c. Divider 31 may be stamped, cast, machined, or otherwise formed from carbon steel, stainless steel, or any other suitable material.

A transfer partition 58 is positioned within housing 12 spaced axially apart from divider 31. Partition 58 has a central opening 58a, a cavity 58b formed in an outer wall of the partition, and at least one flow passage 58c extending through the partition in a direction substantially parallel with axis L. An O-ring or other resilient seal 33 is positioned in cavity 58b to provide a substantially gas-tight seal along the interface between divider and housing wall 12c. Central opening 58a has a shoulder 58d defined therein to aid in positioning and securing an end of transfer tube 22 within housing 12. Partition 58 may be stamped, cast, machined, or otherwise formed from carbon steel, stainless or any other suitable material. A seal (not shown) such as a tape seal, foil seal, or other suitable sealing mechanism may be applied to partition 58 to seal flow passage 58e is a manner known in the art. The seal is rupturable responsive to a pressure forcing coolant 99 (described below) through flow passage 58c after activation of the gas rating system as described below.

Transfer tube or conduit 22 has a first end 22a, a second end 22b, and a fluid flow passage 22c extending therethrough. Tube first end 22a extends into divider central opening 31a and engages resilient seal 32a to form a fluid-tight seal between divider 31 and tube 22. Tube second end 22b extends into partition central opening 58a to abut shoulder 58d. Fluid flow passage 22c at tube second end 22b is in fluid communication with fluid flow passages 59a defined within a flow director 59 (described below). Tube 22 thus enables fluid communication between combustion chamber 63 and flow director passages 59a. Tube 22 may be extruded, roll-formed, or otherwise fabricated from a metal, metal, alloy, or any other suitable material.

Tube first end 22a may be covered with a rupturable, gas-tight seal or shim 61 to seal the end of the tube. Various known disks, foils, films, or tapes (for example, aluminum or stainless steel shims, foil or tape) may be used to form the seal. Tube end 22a may be positioned within central opening 31a so as not to project beyond an end face of the divider. Then, shim 61 may be adhered to the end face through the use of an adhesive. Alternatively, other materials or methods may be used to seal end closure tube end 22a.

All of the embodiments of the gas generating system disclosed herein incorporate a liquid coolant, generally designated 99, for cooling gases generated by combustion of gas generant material 60. In the embodiment shown in FIG. 1, a quantity of coolant 99 is positioned within an annular chamber 101 defined by divider 31, transfer tube 22, and partition 58. It has been found that if desired, with selection of an appropriate coolant, the heat resulting from combustion of the gas generant can be used to evaporate at least a portion of the coolant, for providing an additional amount of fluid for inflating or actuating a gas-actuatable device. It has also been found that this additional inflation fluid aids in achieving and sustaining a pressurized condition in the gas-actuatable device. It has also been found that the coolant media can also serve as a filtration medium to aid in removing particulates from the generated gases.

Coolant 99 is a liquid substance which is capable of cooling the generated gases to the desired degree, and which (if desired) is vaporizable upon exposure to the generated gases and other combustion products, to provide an additional volume of inflation fluid according to the needs of a particular application. The composition of the liquid coolant and the amount of coolant can be selected based on one or more factors pertinent to a particular application, such as the amount of gas generated by combustion of the gas generant, the total amount of gas needed to inflate the inflatable device, effluent quality, the volume of liquid storage space available in the housing, the amount of additional gas moles desired from vaporization of the liquid for filling the inflatable device, the specific heat of the liquid, the amount of heat the liquid needs to absorb from gases in order to cool the gases to a predetermined temperature, the desired final temperature of the gas entering the inflatable device, the temperature of the gases entering the coolant, the amount of gas generated by combustion of the gas generant, booster compound, and auto-ignition compound, and other pertinent factors, according to the requirements of a particular application.

Due to the relatively high specific heat and relatively low cost of water, mixtures containing water are generally inexpensive and efficient alternatives for use in cooling the generated gases, especially over an extended time period. However, other suitable types and compositions of liquid media are also contemplated.

Examples of suitable coolant mixtures are salt solutions, such as solutions containing metal salts. An aqueous salt solution is desired relative to reducing the freezing point of the coolant whereby the particular concentration of the aqueous salt solution may be varied depending on the freezing point of the respective coolant and the solids that would be contained upon vaporization of the associated water. Exemplary coolants include saline solutions containing alkali metal and alkaline earth metal formates, acetates, chlorides, and mixtures thereof. Other exemplary coolants include aqueous solutions of potassium formate, glycols such as propylene glycol, potassium acetate, and mixtures thereof, and alcohol solutions containing alcohols such as ethyl alcohol.

Coolant 99 is generally positioned along a gas flow path extending between the gas generating system combustion chamber 63 and gas exit apertures enabling fluid communication between the interior of the gas generating system and an exterior of the system, so that generated gases pass through the coolant as they transit between the combustion chamber and the gas exit apertures. However, the coolant may be positioned at any suitable location in the housing, depending on the space available within the housing, the viscosity and composition of the coolant medium, and other factors relating to the requirements of a particular application.

Coolant 99 may be permitted to occupy any or all spaces in the interior of housing 12 that are not otherwise occupied by other components of the gas generating system. Depending on the structure of filter 62 (described below), the viscosity of the coolant, and other factors, coolant may occupy channels or cavities formed in the filter structure. Alternatively, coolant 99 may be confined within a dedicated enclosure or other specified portion of the system interior.

An amount of liquid coolant may be inserted into the outer housing sufficient to occupy substantially all of the space accessible to the coolant, or a lesser amount of coolant may be provided, thereby leaving space within the outer housing for the coolant to shift position according to forces (such as gravity or inertial forces resulting from vehicle movement) exerted on the gas generating system.

As seen in FIG. 1, divider 31, transfer tube 22, transfer partition 58, and housing 12 combine to define an enclosure or coolant chamber for containing the liquid coolant therein prior to activation of the gas generating system. The material (s) from which any of the system components in contact with the coolant are formed may be specified such that the component is chemically compatible with the coolant material 99. This helps prevent damage to, or degradation of, the component material(s) resulting from exposure to the coolant material. Alternatively, the materials from which the components defining the coolant chamber are formed may be specified so as to be chemically and otherwise compatible with a selected coolant formulation. For example, carbon steels and stainless steels are suitable for the applications described herein.

Flow director 59 includes a plurality of flow passages 59a extending therethrough, a projection 59b which extends into central opening 58a of transfer partition 58, and a flange 59c extending therefrom. Flow passages 59a enable fluid communication between tube flow passage 22c and a filter 62 (described below), providing a fluid flow path for gas generant combustion products to the filter. Flow director 59 may be cast, machined, or otherwise formed from carbon steel, stainless steel, or any other suitable material.

A filter 62 is positioned within housing 12 for filtering particulates from gases generated by combustion of gas generant 60. Filter 62 is generally cylindrical and includes a central portion 62a and a circumferential portion 62b enclosing the central portion. The relative lengths of the central and circumferential portions are specified such that central portion 62a is recessed within circumferential portion 62b to form a cavity for receiving a portion of flow director 59 therein in a snug fit. The filter may be formed from any of a variety of materials (for example, a carbon fiber or metallic mesh or perforated sheet, or a compressed knitted metal wire) known in the art for filtering gas generant combustion products. Suitable metallic mesh is readily obtainable from suppliers such as Wayne Wire, Inc., of Kalkaska, Mich. Suitable compressed knitted metal wire is commercially available from vendors such as Metex Corp. of Edison, N.J.

A diffuser 16 is secured to outer housing second end 12b, using one or more known methods, such as crimping or welding. Diffuser 16 has a body portion 16a, a central fluid flow passage 16b extending through the length of the diffuser, a wall 16c extending from the base portion to define a cavity 16d in fluid communication with flow passage 16b, a flange 16e extending from the body portion, and at least one opening 16f in fluid communication with passage 16b to enable fluid communication between flow passage 16b and an exterior of the housing 12. Passage 16b receives generated gases and coolant vapor passing through filter 62 and channels the gases and vapor to one or more openings 16f in the diffuser for distributing gases to an exterior of the gas generating system. A peripheral cavity 16j is formed along a periphery of flange 16e, and an O-ring or other resilient seal 16g is positioned in cavity 16j to provide a substantially gas-tight seal along the interface between diffuser 16 and housing wall 12c. Diffuser 16 may be cast, machined, or otherwise formed from carbon steel, stainless steel, or any other suitable material.

The above-described engagement between partition 58, tube 22, and flow director 59, filter 62, and diffuser 16 aids in positioning and securing these elements within the outer housing. In addition, as seen in FIG. 1, a generally annular cavity 80 is formed between housing 12 and the previously described elements positioned within the housing. Cavity 80 effectively serves as a mixing chamber for combustion by-products received from combustion chamber 63 and coolant 99 received from chamber 101, in a manner described in greater detail below.

Operation of the embodiment of the gas generating system shown in FIG. 1 will now be discussed.

Upon receipt of a signal from a crash sensor or other gas generating system activation mechanism, an electrical activation signal is sent to igniter 40a, which ignites to initiate combustion of booster material 28. Ignition of the booster material results in the rupturing of seal 27 covering end closure cavity 14c and a flow of combustion products through out of the cavity and into combustion chamber 63 igniting gas generant 60. Ignition of gas generant 60 results in a relatively rapid generation of combustion products and an increase in pressure within the housing, producing rupture of the seal 61 covering transfer tube first end 22a. Combustion by-products then flow from combustion chamber 63 through tube 22 and into flow director passages 59a. The combustion products are then redirected by flow director 59 into chamber 80. In addition, the increased pressure in chamber 63 resulting from combustion of the gas generant begins to force divider 31 in the general direction indicated by arrow "A".

Movement of divider 31 in direction "A" forces the coolant in chamber 101 through partition passages 58c and into cavity 80, where the coolant intermixes with the combustion products emanating from flow director 59. The combustion products flow out of the inner housing through openings 59a and into the portion(s) 80 of the housing interior containing the liquid coolant, passing through and mixing with the liquid coolant as they flow from inner housing 22 toward second end closure 16. The coolant enters cavity 80 in a nebulized or atomized state, the fine droplets of the coolant having a relatively high aggregate surface area. This facilitates heat transfer from the combustion products to the coolant, which cools the combustion products and vaporizes the coolant.

In a particular embodiment, the gas generating system is designed and the coolant amount and composition is specified such that heat transferred from the gases changes the phase of the coolant from liquid to vapor, producing additional molar inflation gas output for filling an associated inflatable device (not shown). The combustion by-products, vaporized coolant, and any unvaporized coolant are forced through filter 62 to remove particulates from the combustion by-products and to further cool any generated gases. The mixture of filtered, generated gases and coolant vapor then exits the gas generating system via opening(s) 16*f*.

In addition, the evaporated liquid coolant can act as an airbag release agent. In instances where an airbag is to be inflated and the liquid coolant used is water or water-based, humidification or introduction of water vapor (from evaporation of the coolant by the generated gases) reduces the pressure required to release and inflate an airbag in fluid communication with the gas generating system. The water vapor functions to lubricate the airbag opening resulting in improved vehicle restraint performance and a "break" in the airbag at a lower pressure than would be the case for a gas generating system not employing the liquid coolant. Thus, the force of the airbag deployment is decreased given the reduction in "break", thereby enhancing occupant safety. The ideal airbag "break" is zero pressure. The term "break" is defined as the point the airbag releases and begins to inflate.

Figure 2:
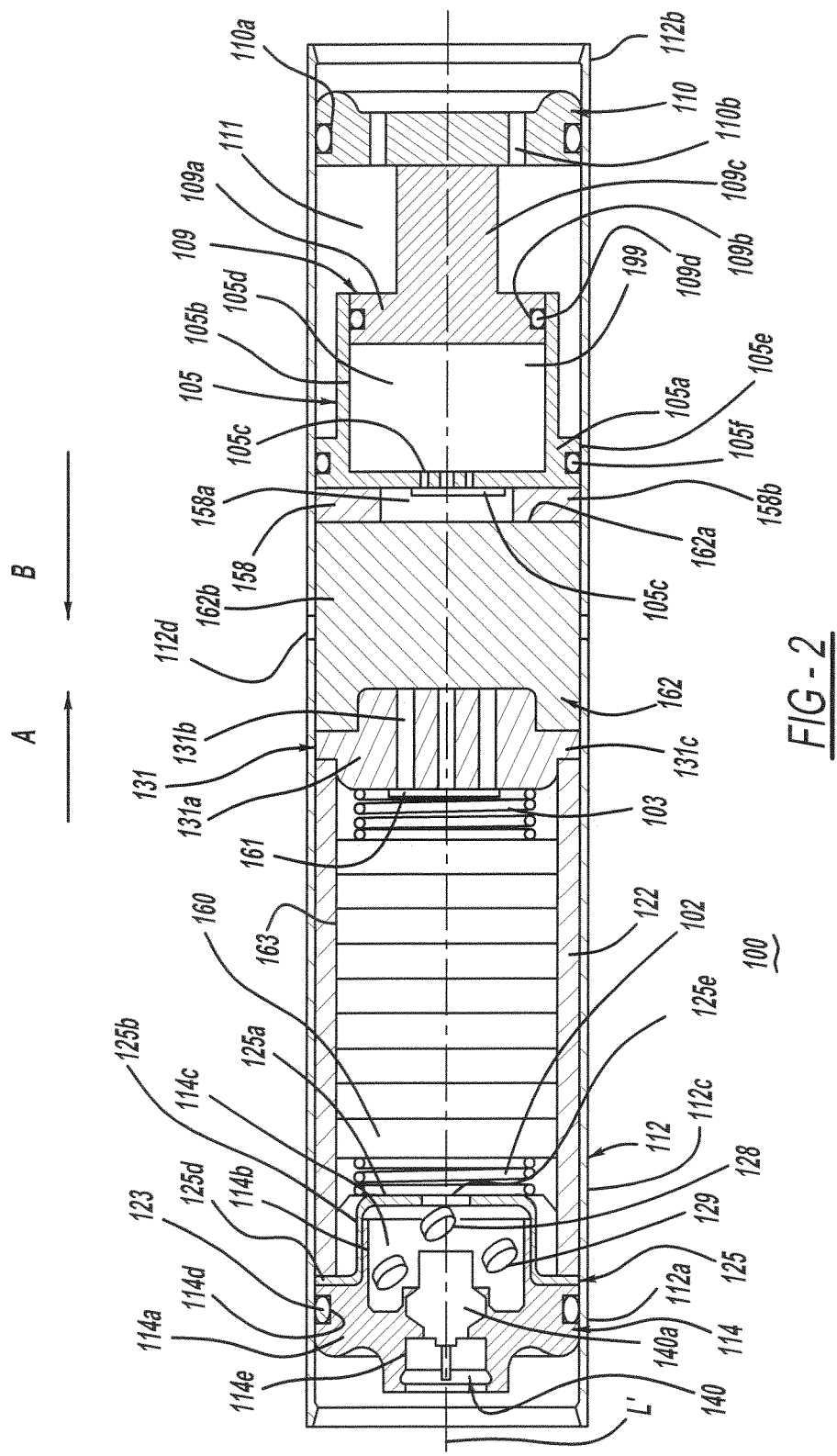
FIG. 2 is a cross-sectional side view of a gas generating system in accordance with another embodiment of the present invention.

FIG. 2 shows a gas generating system 100 incorporating a liquid coolant, in accordance with a second embodiment of the present invention.

Gas generating system 100 includes a substantially cylindrical housing 112 having a pair of opposed ends 112*a*, 112*b* and a wall 112*c* extending between the ends to define a housing interior cavity. One or more gas exit apertures 112*d* are formed along wall 112*c* to enable fluid communication between the interior of the housing and an exterior of the housing. A longitudinal axis L' extends along the length of the housing. Housing 112 may be extruded, roll-formed, or otherwise fabricated from a metal, metal, alloy, or any other suitable material.

Housing gas exit apertures 112*d* may be covered with rupturable, gas-tight seals or shims (not shown) to seal the apertures. Various known disks, foils, films, or tapes (for example, aluminum or stainless steel shims, foil or tape) may be used to form the seals. Alternatively, other materials or methods may be used to seal the apertures.

A first end closure 114 is secured to end 112*a* of housing 112, using one or more known methods, such as crimping or welding. End closure 114 has formed therein a base portion 114*a*, a wall 114*b* extending from the base portion, a cavity 114*d* formed along a periphery of base portion 114*a*, and a central orifice 114*e* extending through base portion 114*a*. Wall 114*b* and base portion 114*a* define a cavity 114*c* in which a quantity of a known booster material 128 (described below) is positioned. An O-ring or other resilient seal 123 is positioned in peripheral cavity 114*d* to provide a substantially gas-tight seal along the interface between end closure 114 and housing wall 112*c*. End closure 114 may be stamped, cast, machined, or otherwise formed from carbon steel, stainless steel, or any other suitable material.

Referring to FIG. 2, an igniter assembly 140 containing an igniter 140*a* is positioned and secured within end closure central orifice 114*e* so as to enable fluid communication between the igniter and booster material 128 positioned in end closure cavity 114*c*. Igniter assembly 140 may be secured in central orifice 114*e* using any one of several known methods, for example, by welding, crimping, using an interference fit, or by adhesive application. Igniter assemblies suitable for the application described herein may be obtained from any of a variety of known sources, for example Primex Technologies, Inc. of Redmond, Wash. or Aerospace Propulsion Products Bv, of The Netherlands. Igniter 40*a* may be formed as known in the art. Exemplary igniter Construction are described in U.S. Pat. Nos. 6,009,809 and 5,934,705, incorporated herein by reference. Igniter 140*a* may be secured within igniter assembly 140 by any one of a variety of methods, for instance using welds, adhesives, by crimping, or by integrally molding the igniter into a portion of the igniter assembly.

A booster cup 125 is positioned over first end closure wall 114*b* to cover cavity 114*c* and retain booster material 128 therein. Booster cup 125 has a base portion 125*a*, a generally cylindrical wall 125*b* extending from the base portion, and a flange 125*d* extending from the wall 125*b*. Base portion 125*a* and wall 125*b* define a cavity for positioning a booster material therein. Booster cup 125 serves as a combustion chamber for booster material 128 (described below). Wall 125*b* is dimensioned to receive first end closure wall 114*b* therein. Base portion has an orifice 125*e* formed therein to enable fluid communication between end closure cavity 114*c* and an exterior of the booster cup after activation of the gas generating system. This fluid communication enables transfer of booster material combustion products into a gas generant combustion chamber 163 containing a gas generant material 160 (described below), for use in igniting gas generant 160. Booster cup 125 may be stamped, east, drawn, or otherwise formed from carbon steel, stainless steel, or any other suitable material.

Booster cup orifice 125*e* may be covered with a rupturable, gas-tight seal or shim (not shown) to seal the orifice. Various known disks, foils, films, or tapes (for example, aluminum or stainless steel shims, foil or tape) may be used to form the seal. The seal material is typically adhered to a surface of the booster cup base portion through the use of an adhesive. Alternatively, other materials or methods may be used to seal booster cup orifice 125*e*.

Referring again to FIG. 2, a quantity of a known booster material 128 is positioned within end closure cavity 114*c*. Activation of igniter 140*a* produces combustion of the booster material, producing ignition of gas generant composition 160 (described below) in a manner known in the art.

A quantity of a known heat-activated auto-ignition material 129 may be positioned within the gas generating system so as to enable fluid communication between the auto-ignition material and an associated gas generant material 160 and/or an associated booster material 128 upon activation of the gas generating system. In the embodiment shown in FIG. 2, auto-ignition material 129 is positioned within end closure cavity 114*c*, in fluid communication with booster material 128. Auto-ignition material 129 is a pyrotechnic material which is ignited by exposure to a temperature lower than the ignition temperature of gas generant 160. As is known in the art, auto-ignition material 129 is ignited by heat transmitted from an exterior of housing 112 to the interior of the housing due to an elevated external temperature condition (produced, for example, by a fire). Combustion of auto-ignition material 129 results in combustion of gas generant 160, either directly or through intervening combustion of booster material 128. Suitable auto ignition materials are known to those skilled in the art. Examples of suitable auto-ignition materials are nitrocellulose based compositions and gun powder.

Referring again to FIG. 2, a quantity of a propellant or gas generant material 160 is contained within housing 112 between booster cup 125 and a combustion by-product transfer plate 131 (described below) for production of gases when ignited by igniter booster material combustion products. This portion of the housing interior between booster cup 125 and transfer plate 131 defines a gas generant combustion chamber 163. Gas generant 160 may be in any of a variety of forms, for example tablets, stacked wafers, or in granulated form. Gas generant material 160 may be formulated by known methods, and in one embodiment is exemplified by "smokeless" gas generant compositions as described in U.S. Pat. Nos. 5,872,329, 6,074,502, 6,287,400, 6,306,232 and 6,475,312 incorporated by reference herein. As used herein, the term "smokeless" should be generally understood to mean such propellants as are capable of combustion yielding at least about 90% gaseous products based on a total product mass; and, as a corollary, no more than about 10% solid products based on a total product mass. However, the present invention is not limited to the use of smokeless gas generant compositions therein.

A first spring member 102 is positioned between the gas generant stack and the booster cup 125. A second spring member 103 is positioned between the gas generant stack and transfer plate 131. Spring members 102 and 103 aid in maintaining the gas generant wafers in a single, compact stack by occupying the clearance between the stack and the booster cup and transfer plate. Spring members 102 and 103 also aid in attenuating the effects of shock and vibration on the gas generant stack. In the embodiment shown in FIG. 2, the spring members are in the form of coil springs. However, spring members 102 and 103 may have any structure suitable for the purposes described herein.

Transfer plate 131 is positioned within housing 12 so as to enable fluid communication with gas generant combustion by-products upon activation of the gas generating system. Transfer plate 131 has a body portion 131a, at least one flow passage 131b extending through the body portion, and an annular flange 131c projecting from the body portion. Flow passage (or passages) 131b enable fluid communication between gas generant combustion by-products in chamber 163 and a filter 162 (described below). Transfer plate 131 may be stamped, cast, machined, or otherwise formed from carbon steel stainless steel, or any other suitable material.

A surface of transfer plate facing spring member 103 may be covered with a rupturable, gas-tight seal or shim 161 to seal the flow passages 131b in the transfer plate. Various known disks, foils, films, or tapes (for example, aluminum or stainless steel shims, foil or tape) may be used to form the seal. Alternatively, other materials or methods may be used to seal the transfer plate passages.

An insulating tube 122 is positioned between booster cup 125 and transfer plate 131 and encloses gas generant chamber 163. Tube 122 insulates the exterior of housing 112 from heat produced by combustion of the gas generant. Tube 122 may be formed from any suitable thermal insulating material capable of performing the required function during the gas generant combustion process. For example, a ceramic compound may be used.

A filter 162 is positioned within housing 112 for filtering particulates from gases generated by combustion of gas generant 160. Filter 162 is generally cylindrical and includes a central portion 162a and a circumferential portion 162b enclosing the central portion. The relative lengths of the central and circumferential portions are specified such that central portion 162a is recessed within circumferential portion 162b to form cavities for receiving portions of transfer plate 131 and a partition 158 (described below) therein in a snug fit. The filter may be formed from any of a variety of materials (for example, a carbon fiber or metallic mesh or perforated sheet, or a compressed knitted metal wire) known in the art for filtering gas generant combustion products. Suitable metallic mesh is readily obtainable from suppliers such as Wayne Wire, Inc., of Kalkaska, Mich. Suitable compressed knitted metal wire is commercially available from vendors such as Metex Corp. of Edison, N.J.

The portion of the housing containing filter 162 effectively serves as a mixing chamber for combustion by-products received from combustion chamber 163 and coolant 199 received from receptacle chamber 105d (described below), in a manner described in greater detail below.

A partition 158 is positioned within housing 112 abutting filter 162 to aid in positioning and securing the filter within the housing. Partition 158 is press-fit, crimped, or otherwise suitably secured within housing 112 so as to secure the partition in a predetermined position within the housing. Partition 158 has a central opening 158a and a shoulder 158b extending from a surface of the partition for engaging a complementary cavity formed in filter 162. Opening 158a enables fluid communication between filter 162 and a liquid coolant 199 (as previously described) which is injected into filter 162 to intermix with the gas generant combustion products, in a manner described in greater detail below. Partition 158 may be stamped, cast, machined, or otherwise formed from carbon steel, stainless steel, or any other suitable material.

A piston receptacle 105 abuts partition 158. Receptacle 105 includes a base portion 105a, a wall 105b extending from the base portion, and at least one flow passage 105c formed in the base portion. Base portion 105 and wall 105b define a cavity 105d in which a quantity of liquid coolant (as previously described) is positioned. A groove 105e is formed along an outer surface of the base portion for receiving an O-ring or other resilient seal 105f therein. Seal 105f engages housing wall 112c to form a fluid-tight seal between the receptacle and the housing. Receptacle 105 is movable in the general direction indicated by arrow "A" under the influence of increased internal housing pressure resulting from combustion of the gas generant. Direction "B" may be opposite direction "A", as shown in FIG. 2. Receptacle 105 may be stamped, cast, machined, or otherwise formed from carbon steel, stainless steel, or any other suitable material.

A surface of receptacle 105 facing partition 158 may be covered with a rupturable, gas-tight seal or shim 108 to seal the flow passage(s) 105c in the partition. Various known disks, foils, films, or tapes (for example, aluminum or stainless steel shims, foil or tape) may be used to form the seal. Alternatively, other materials or methods may be used to seal the receptacle passages.

A piston 109 includes a piston head 109a, a groove 109b formed along a periphery of the piston head, and a stem 109c projecting from the piston head. Groove 109b receives an O-ring or other resilient seal 109d therein which engages receptacle wall 105b to form a fluid-tight seal between the receptacle and the piston head. The seal also enables the receptacle to slide with respect to piston head 109a. Piston 109 may be cast, machined, or otherwise formed from carbon steel, stainless steel, or any other suitable material.

In an alternative embodiment, the ably or slidably mounted with respect to the piston receptacle and/or a portion of housing 112, and the piston receptacle is mounted within the housing so as to remain stationary. Alternatively, both the piston and the piston receptacle may be movable or slidably mounted within respect to each other and/or with respect to the housing.

A liquid coolant 199 as previously described is positioned within a chamber 111 formed between receptacle 105 and piston 109. As seen in FIG. 2, piston receptacle 105, and piston 109 combine to define an enclosure or coolant chamber for containing the liquid coolant 199 in cavity 105d prior to activation of the gas generating system. The material(s) from which any of the system components in contact with the coolant are formed should be specified such that the component is chemically compatible with the coolant material 99. This helps prevent damage to, or degradation of, the component material(s) resulting from exposure to the coolant material. Alternatively, the materials from which the components defining the coolant chamber are formed may be specified so as to be chemically and otherwise compatible with a selected coolant formulation.

A second end closure 110 is secured to end 112b of housing 112, using one or more known methods, such as crimping or welding. End closure 110 includes a groove 110a extending along a periphery thereof and at least one opening 110b extending therethrough to enable fluid communication between the interior of the housing and the exterior of the housing. Opening(s) provide a vent for the release of air residing in chamber 111 formed between the housing and the piston/receptacle sub-assembly previously described. Piston 109 abuts a surface of end closure 110 such that the surface of the end closure provides a bearing surface to hold the piston stationary when receptacle 105 moves with respect to the piston in direction "B", as described below. End closure 110 may be cast, machined, or otherwise formed form from carbon steel, stainless steel, or any other suitable material.

The material(s) from which any of the system components in contact with the coolant are formed should be specified such that the component is chemically compatible with the coolant material 99. This helps prevent damage to, or degradation of, the component material(s) resulting from exposure to the coolant material.

Operation of the embodiment of the gas generating system shown in FIG. 2 will now be discussed.

Upon receipt of a signal from a crash sensor, an electrical activation signal is sent to igniter 140a, which ignites to initiate combustion of booster material 128 and auto ignition material 129. Ignition of the booster material results in the rupturing of any seal covering booster cup opening 125e and a flow of combustion products out of the booster cup and into combustion chamber 163, igniting gas generant 160. Ignition of gas generant 160 results in a relatively rapid generation of combustion products and an increase in pressure within the housing, producing rupture of the seal 161 covering transfer plate openings 131b. Combustion by-products then flow from combustion chamber 163 through transfer plate 131 and into filter 162. The increase in internal housing pressure forces piston receptacle 105 to move in the direction indicated by arrow "A" (see FIG. 2).

Pressure on liquid coolant 199 (pressed between receptacle 105 and piston 109) causes seal 108 to rupture, allowing coolant to flow through passages 105c (in direction "B") as receptacle 105 moves in direction "A". This coolant flows into filter 162 and mixes with gases and other combustion by-products from the combustion of gas generant 160. The coolant enters filter 162 in a nebulized or atomized state, the fine droplets of the coolant having a relatively high aggregate surface area. This facilitates heat transfer from the combustion products to the coolant, which cools the combustion products and vaporizes the coolant.

In a particular embodiment, the gas generating system is designed and the coolant amount and composition are specified such that heat transferred from the gases changes the phase of the coolant from liquid to vapor (or, in the event a combustible liquid coolant is used, ignites the coolant), producing additional molar inflation gas output for filling an associated inflatable device (not shown).

The combustion by-products, vaporized coolant, and any unvaporized coolant are forced through filter 62 to remove particulates from the combustion by-products and to further cool any generated gases. The mixture of filtered, generated gases and coolant vapor then exits the gas generating system via opening(s) 112d. In addition, the evaporated liquid coolant can act as an airbag release agent as previously described.

Figure 2A:
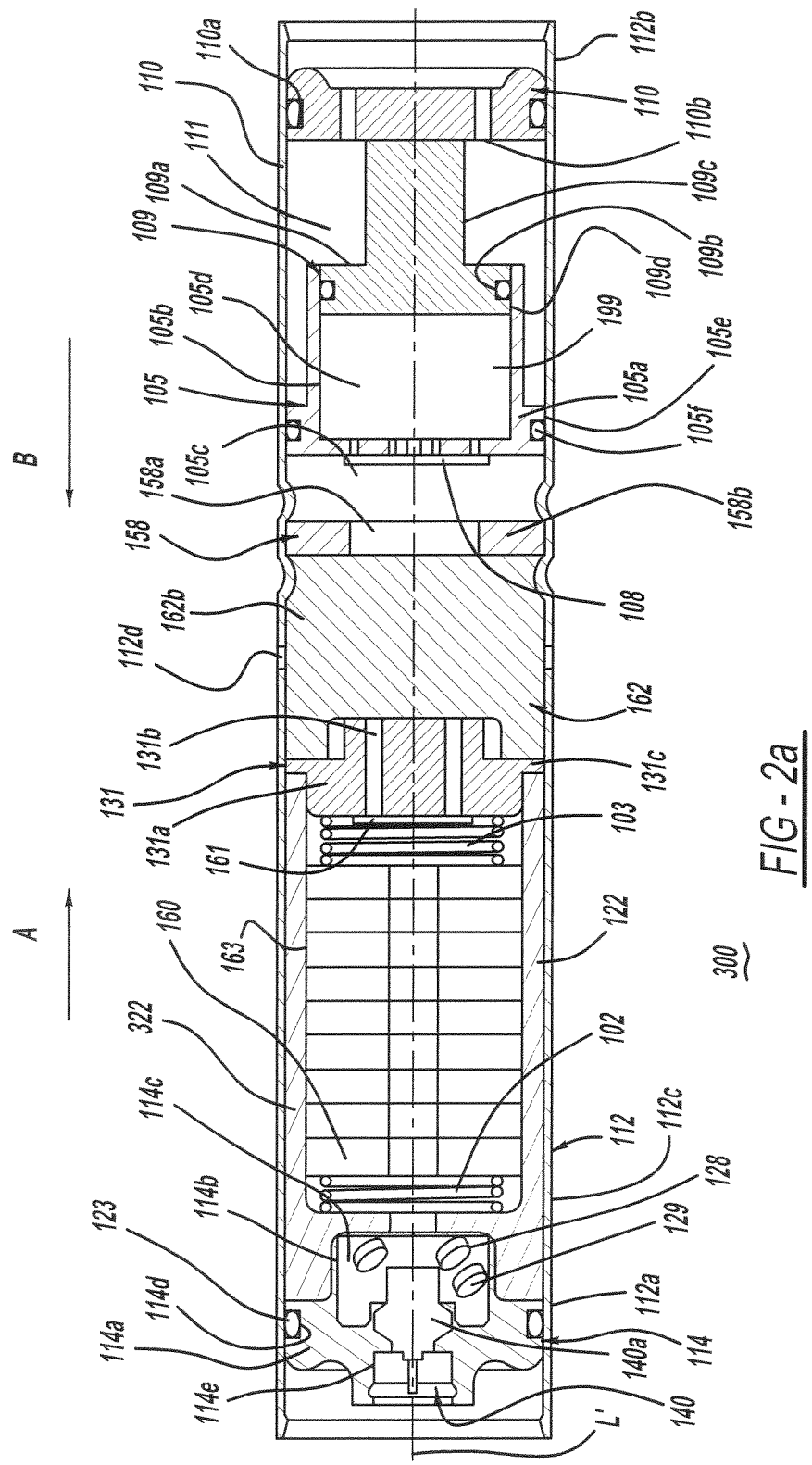
FIG. 2a is a cross-sectional side view of a gas generating system in accordance with another embodiment of the present invention.

FIG. 2a shows an embodiment 300 of a gas generating system almost identical to embodiment 100 shown in FIG. 2. However, in the embodiment shown in FIG. 2a, booster cup 125 of FIG. 2 has been omitted and a covering portion is formed on insulating tube 122 for covering the open end of end closure 114 defined by wall 114b, to retain the booster and auto-ignition materials 128 and 129 therein.

Figure 2B:
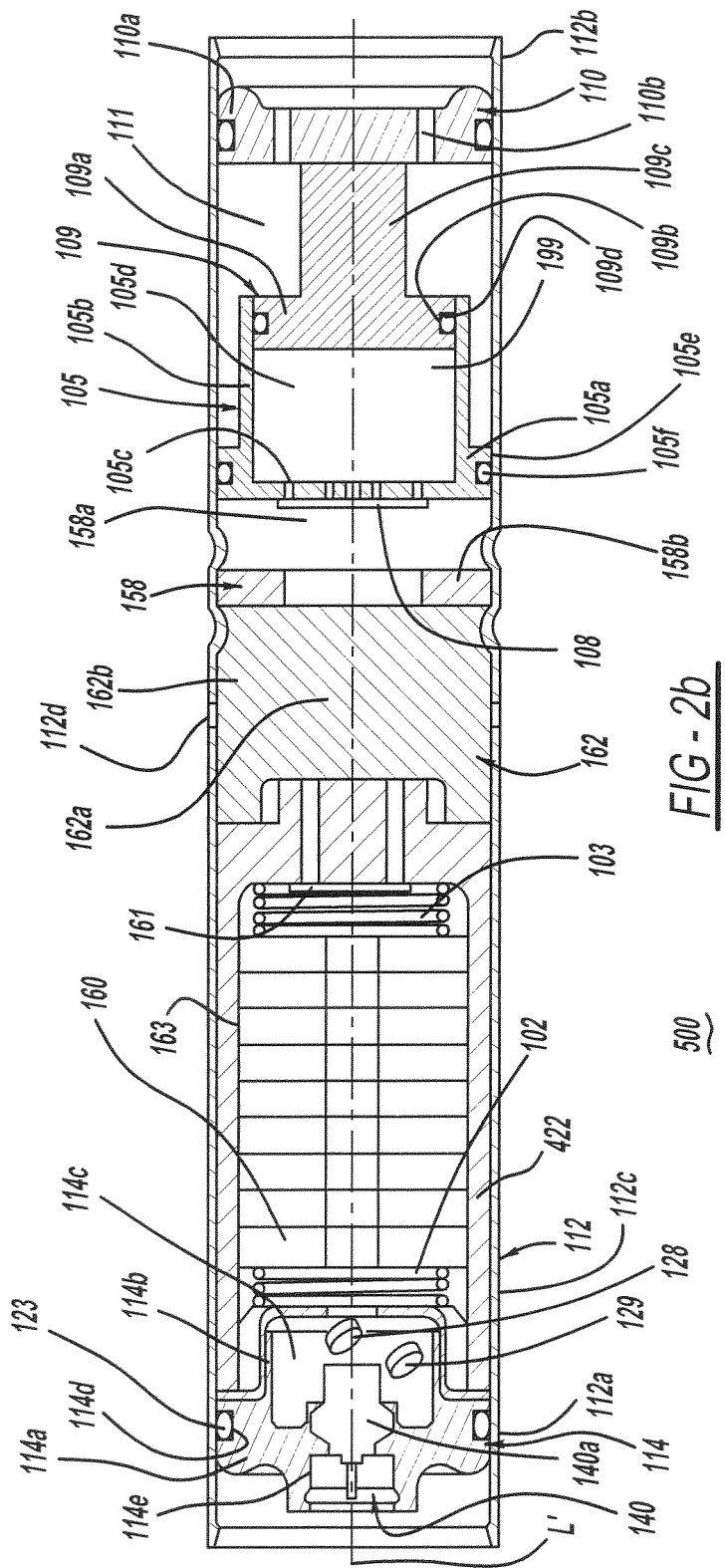
FIG. 2b is a cross-sectional side view of a gas generating system in accordance with another embodiment of the present invention.

FIG. 2b shows an embodiment 500 of a gas generating system almost identical to embodiment 100 shown in FIG. 2. However, in the embodiment shown in FIG. 2b, transfer plate 131 of FIG. 2 is incorporated into or formed integrally with tube 422.

Figure 3:
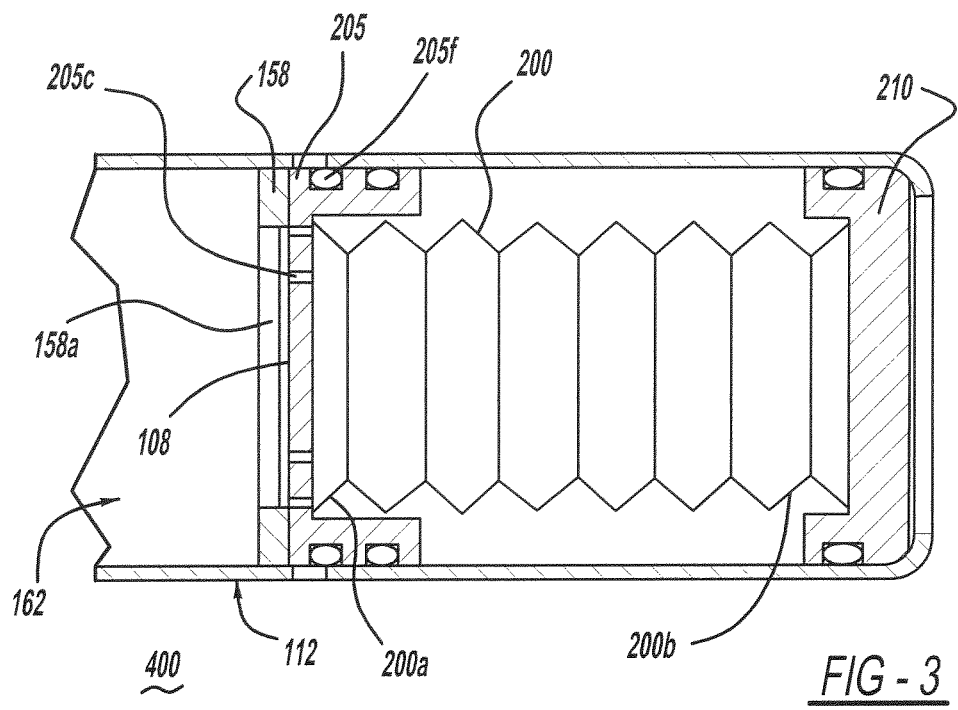
FIG. 3 is a cross-sectional side view of a gas generating system in accordance with another embodiment of the present invention.

FIG. 3 shows a portion of an embodiment 400 of a gas generating system similar to embodiment 100 shown in FIG. 2. In FIG. 3, the elements of the system appearing to the right of partition 158 in FIG. 2 have been replaced with the alternative elements shown. The remaining features of the embodiment shown in FIG. 3 (i.e., those to the left of the partition 158) are the same as those shown in FIG. 2 and have been omitted from FIG. 3 for clarity.

Referring to FIG. 3, in this embodiment, coolant material 199 is housed in a length of axially expandable/collapsible tubing 200 positioned between a receptacle 205 and a second end closure 210. Thus, the interior of tubing 200, receptacle 205, and end closure 210 combine to form a coolant chamber for coolant 199. Tubing 200 may have a first end 200a secured to receptacle 205 and a second end 200b secured to second end closure 210 so as to form fluid-tight seals between the tubing and the receptacle and end closure, to aid in preventing leakage of the coolant from the tubing.

Tubing 200 may be formed from a polymer material or any other suitable material, and may have a corrugated structure or any other structure suitable for enabling axial expandability and/or collapsibility of the tube. Tubing 200 may comprise, for example, polyethylene blow-molded corrugated tubing or polypropylene blow-molded corrugated tubing. The material(s) from which the tubing is formed and the structure of the tubing may be specified such that the tubing is chemically compatible with coolant material 199. This helps prevent damage to, or degradation of, the tubing material(s) resulting from exposure to the coolant material. Alternatively, the tubing material may be specified so as to be chemically and otherwise compatible with a selected coolant formulation. The materials) from which the tubing is formed and the structure of the tubing should also be specified such that the tubing can withstand pressures exerted by the coolant on the tubing during operation of the gas generating system without rupturing.

Any suitable method be used to secure the tubing ends 200a and 200b to receptacle 205 and second end closure 210, depending on the needs of a particular application, on the materials from which the tubing, receptacle, and second end closure are formed, and other factors. However, any fasteners, adhesives, or other securement methods used should be chemically compatible with the coolant material residing within the interior of tube 200, so that securement of the tubing ends is not degraded by long-term exposure of the securement means to the coolant material. The securement method should also ensure retention of the fluid-tight seals formed between the tubing, receptacle, and end closure when subjected to the forces produced by operation of the gas generating system. As in previously described embodiments, a seal 108 may be positioned over openings 205c to maintain the coolant inside tubing 200 prior to activation of the gas generating system.

In operation, pressure from generated gases forces receptacle 205 in direction "A" (see FIG. 2)) as previously described. Pressure on liquid coolant 199 (pressed between receptacle 205 and end closure 210) causes seal 108 to rupture, allowing coolant to flow through passages 205c (in direction "B" (see FIG. 2)) as receptacle 205 moves in direction "A". This coolant flows into filter 162 (positioned to the left of partition 158) (not shown) and mixes with gases and other combustion by-products from the combustion of gas generant 160, as previously described. The generate gases and evaporated coolant then exit the housing via openings 112d (not shown).

Figure 4:
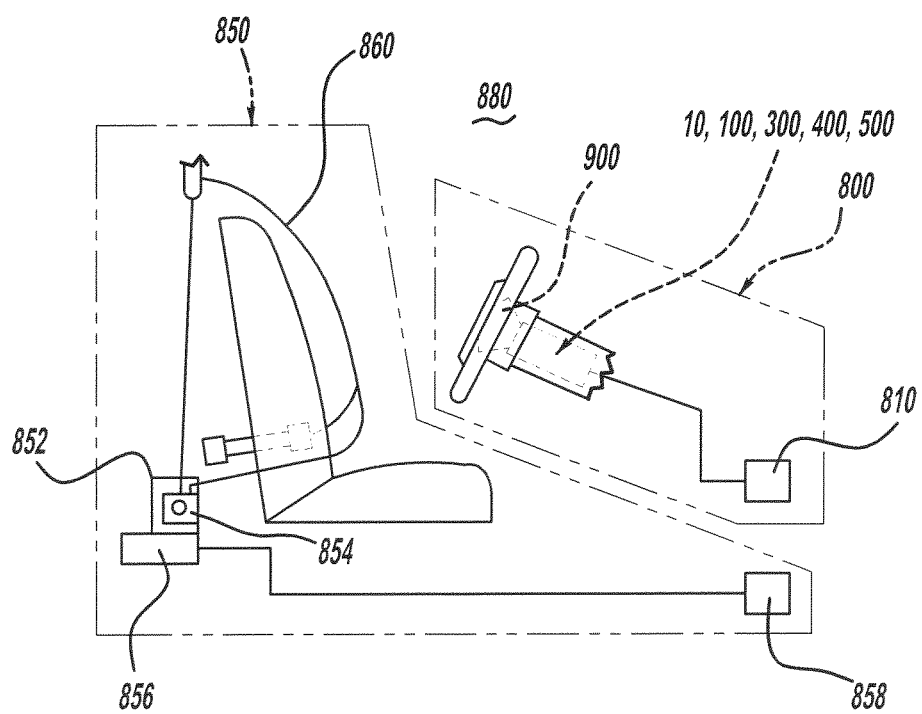
FIG. 4 is a schematic representation of an exemplary vehicle occupant protection system incorporating a gas generating system in accordance with an embodiment of the present invention.

Referring to FIG. 4, in one possible application of the gas generating system described herein, an embodiment of the gas generating system is incorporated into an airbag system 800. Airbag system 800 includes at least one airbag 900 and a gas generating system in accordance with one of the embodiments 10, 100, 400 described herein and coupled to the airbag so as to enable fluid communication with an interior of the airbag upon activation of the gas generating system. System 800 may include (or be in operative communication with) a crash event sensor 810 that includes (or is in operative communication with) a crash sensor algorithm (not shown) which signals activation of airbag system 800 via, for example, activation of an igniter (not shown in FIG. 4) in the event of a collision.

Referring again to FIG. 4, an embodiment of the gas generating system or an airbag system including an embodiment of the gas generating system may be also incorporated into a broader, more comprehensive vehicle occupant protection system 880 including additional elements such as a safety belt assembly 850. Safety belt assembly 850 includes a safety belt housing 852 and a safety belt 860 extending from housing 852. A safety belt retractor mechanism 854 (for example, a spring-loaded mechanism) may be coupled to an end portion of the belt. In addition, a safety belt pretensioner 856 may be coupled to belt retractor mechanism 854 to actuate the retractor mechanism in the event of a collision. Typical seat belt retractor mechanisms which may be used in conjunction with safety belt 860 are described in U.S. Pat. Nos. 5,743,480, 5,553,803, 5,667,161, 5,451,008, 4,558,832 and 4,597,546, incorporated herein by reference. Illustrative examples of typical pretensioners with which safety belt 860 may be combined are described in U.S. Pat. Nos. 6,505,790 and 6,419,177, incorporated herein by reference.

Safety belt assembly 850 may include (or be in operative communication with) a crash event sensor 858 (for example, an inertia sensor or an accelerometer) that includes (or is in operative communication with) a crash sensor algorithm (not shown) which signals actuation of belt pretensioner 856 via, for example, activation of a pyrotechnic igniter (not shown) incorporated into the pretensioner. U.S. Pat. Nos. 6,505,790 and 6,419,177, previously incorporated herein by reference, provide illustrative examples of pretensioners actuated in such a manner.

It will be appreciated that the various constituents described above are formed in known manners. For example, the various components may be molded. stamped or otherwise metal formed from carbon steel, aluminum, metallic alloys, or any of a variety of polymers.

It will be understood that the foregoing description of an embodiment of the present invention is for illustrative purposes only. As such, the various structural and operational features herein disclosed are susceptible to a number of modifications commensurate with the abilities of one of ordinary skill in the art, none of which departs from the scope of the present invention as defined in the appended claims.

What is claimed is:

1. A gas generating system comprising:
a housing;
a gas generant combustion chamber within the housing;
a liquid coolant chamber within the housing;
a filter positioned within the housing so as to enable fluid communication with the combustion chamber and the coolant chamber after activation of the gas generating system, to enable mixing within the filter of combustion products from the combustion chamber with coolant from the coolant chamber; and
a movable member positioned within the housing in operative communication with the coolant chamber, such that movement of the movable member forces coolant from the coolant chamber toward the filter, wherein at least one opening is formed in the movable member, and wherein the movement of the movable member forces coolant along the at least one opening.

2. A gas generating system comprising:
a housing;
a gas generant combustion chamber within the housing;
a liquid coolant chamber within the housing;
a mixing chamber positioned within the housing so as to enable fluid communication with the combustion chamber and the coolant chamber after activation of the gas generating system; and
a movable member positioned within the housing in operative communication with the coolant chamber, such that movement of the movable member forces a coolant from the coolant chamber toward the mixing chamber,
wherein at least one opening is formed in the movable member, and wherein movement of the movable member forces an amount of the coolant along the at least one opening,
wherein a portion of the coolant chamber is defined by a length of axially expandable/collapsible tubing and the movable member, and
wherein the tubing is structured to be collapsible responsive to movement of the movable member in a first direction.

3. An airbag system comprising a gas generating system in accordance with claim 2.

4. A gas generating system comprising:
a housing;
a liquid coolant chamber positioned within the housing, at least a portion of the coolant chamber being defined by a piston and a piston receptacle structured to slidably receive a portion of the piston therein; and
a filter positioned within the housing so as to form a cavity between the filter and the coolant chamber,
wherein the piston receptacle is structured to be movable within the housing and with respect to the piston, and such that movement of the receptacle in a first direction forces a coolant contained in the coolant chamber out of the chamber and into the cavity.

5. An airbag system comprising a gas generating system in accordance with claim 4.

6. The gas generating system of claim 4 wherein the housing defines a portion of the cavity.

7. The gas generating system of claim 4 further comprising:
   at least one opening enabling fluid communication between an interior of the housing and an exterior of the housing; and
   the filter positioned between the coolant chamber and the at least one opening.

8. The gas generating system of claim 4 wherein the receptacle has openings formed therein, and wherein movement of the receptacle in the first direction forces the coolant through the openings in a second direction opposite the first direction.

* * * * *

UNITED STATES PATENT AND TRADEMARK OFFICE
CERTIFICATE OF CORRECTION

PATENT NO. : 8,764,054 B2  
APPLICATION NO. : 12/700473  
DATED : July 1, 2014  
INVENTOR(S) : Mayville et al.

Page 1 of 1

It is certified that error appears in the above-identified patent and that said Letters Patent is hereby corrected as shown below:

In the Specification:

Column 1; Line 44; Please delete "threes" and insert --forces--.

Column 2; Line 27; Please insert --the present invention-- after of.

Column 2; Line 30; Please insert --of the housing are-- after ends.

Column 3; Line 64; Please delete "58e" and insert --58c--.

Column 3; Line 64; Please delete "is" and insert --in--. (First occurrence)

Column 3; Line 67; Please delete "rating" and insert --generating--.

Column 4; Line 12; Please delete "metal, alloy," add insert --metal alloy,--.

Column 6; Line 47; Please delete "of".

Column 7; Line 41; Please delete "metal, alloy," and insert --metal alloy,--.

Column 8; Line 32; Please delete "east" and insert --cast--.

Column 9; Line 44; Please insert --,-- after the first steel.

Column 10; Line 64; Please delete "ably" and insert --piston is movably--.

Column 11; Line 32; Please delete "form".

Column 13; Line 14; Please delete the second ")".

Column 14; Line 3; Please delete "." and insert --,-- after molded.

In the Claims:  
Column 14; Line 34; Claim 1; Please insert --the-- before coolant.

Signed and Sealed this  
Twenty-first Day of October, 2014

Michelle K. Lee  
*Deputy Director of the United States Patent and Trademark Office*